United States Patent [19]

Yokoyama et al.

[11] Patent Number: 4,997,669
[45] Date of Patent: Mar. 5, 1991

[54] PROCESS OF PRODUCING A DEHYDRATED CHEESE

[75] Inventors: Hitoshi Yokoyama, Sennan; Hiroyuki Sano, Kishiwada; Akiko Horimoto; Masatoshi Kizaki, both of Sennan, all of Japan

[73] Assignees: Fuji Oil Company, Limited, Osaka; Shin-Etsu Chemical Co., Ltd., Tokyo, both of Japan

[21] Appl. No.: 268,545

[22] Filed: Nov. 7, 1988

[51] Int. Cl.$^5$ .................. A23C 19/086; A23L 1/0534
[52] U.S. Cl. ................................. 426/582; 426/573; 426/589
[58] Field of Search .................. 426/582, 589, 573

[56] References Cited

U.S. PATENT DOCUMENTS

| | | | |
|---|---|---|---|
| 3,076,709 | 2/1963 | Rivoche | 426/583 |
| 3,310,406 | 3/1967 | Webster | 426/582 |
| 3,978,243 | 8/1976 | Pederson | 426/573 |
| 4,169,160 | 9/1979 | Wingerd et al. | 426/582 |
| 4,199,608 | 4/1980 | Gilmore et al. | 426/582 |
| 4,244,983 | 1/1981 | Baker | 426/582 |

Primary Examiner—Donald E. Czaja
Assistant Examiner—Helen Pratt
Attorney, Agent, or Firm—Wenderoth, Lind & Ponack

[57] ABSTRACT

Cheese comprisng cellulose ether having a methoxy group content of 26 to 33% by weight, conventional cheese and optionally a water-soluble alginate and a calcium salt.

3 Claims, No Drawings

4,997,669

PROCESS OF PRODUCING A DEHYDRATED CHEESE

FIELD OF THE INVENTION

The present invention relates to cheese having excellent heat resistance. Particularly, it relates to dehydrated cheese having excellent shape retention against microwave irradiation heating.

BACKGROUND OF THE INVENTION

From the viewpoint of processing of cheese, it is advantageous to impart certain properties for resisting heat treatment at a temperature higher than several tens degree centigrade, such as shape retention of the cheese. Then, various techniques have heretofore been proposed to provide heat resisting shape retention properties to cheese. For Example, addition of a specific viscosity modifier or protein such as albumin has been proposed [for Example, Japanese Patent Publication Nos. 49-37266 (WPI C74-V76761) and 58-46311 (WPI C79-B12945), Japanese Patent Laid Open Publication No. 55-11292 and 59-198938 (WPI C84-134865)]. Japanese Patent Publication No. 58-56608 (WPI C77-Y64154) and Japanese Patent Laid Open Publication No. 61-1358 (WPI C86-019695) disclose the use of alginic acid or an alginate to improve slightly melt properties with heating. However, shape retention against microwave irradiation heating can not be improved unless a large amount of an alginate is used, whereas the use of too much alginate causes problems. For Example, cheese obtained has inferior mouthfeel such as jelly-like mouthfeel and, when a dehydrated product is prepared therefrom and it is reconstituted with hot water, a hard non-reconstituted part remains.

On the other hand, microwave ovens have become more frequently used for cooking food. However, since as microwave heating causes vaporization of water from inside of food, the above techniques for providing heat resistance can hardly impart shape retention to cheese. Moreover, in an extreme case, the cheese itself is separated into oil and protein and other components and is broken up.

Further, in general, it is difficult to use cheese as an ingredient of instant foods and the like because, when cheese in a shaped state such as blocks or granules is dried or dehydrated as it is, the resulting dehydrated product is hardly reconstituted with hot water. Japanese Patent Laid Open Publication No. 61-158746 (Patent Abstracts of Japan, Vol. 10, No. 362 (C-389) [2419], Dec. 4, 1986) and Japanese Patent Application No. 61-314643 (co-pending U.S. patent application Ser. No. 136,635) have proposed processes for producing dehydrated cheese to solve this problem. These processes for producing dehydrated cheese are useful for obtaining a dehydrated product which can be completely reconstituted with hot water without any hard non-reconstituted part remaining. And, the product can show certain shape retention properties upon reconstitution. However, particularly, in the case of reconstitution with water by using internal heating means such as microwave irradiation, there is still a drawback that it is impossible to prevent separation and loss of cheese. According to the present inventors' finding, even if a conventional technique is simply employed in the latter processes for producing dehydrated cheese to impart the above shape retention properties against heat to cheese, no significant effect can be obtained or, rather, mouthfeel of the product is impaired.

As a result of the present inventors' intensive studies, it has been found that a certain cellulose ether possesses resistance to microwave heating, and further that, in the case of using a cellulose ether having a specific viscosity with or without a water-soluble alginate and a calcium salt, the desired result can be obtained merely by using a small amount of the cellulose ether.

OBJECTS OF THE INVENTION

The main object of the present invention is to provide cheese having heat resistance and shape retention or separation and breakup preventing properties, particularly, dehydrated cheese which maintains excellent heat resistance and shape retention, even reconstitution with hot water is carried out with microwave irradiation heating.

This object as well as other objects and advantages of the present invention will become apparent to those skilled in the art from the following description.

SUMMARY OF THE INVENTION

According to the present invention, there is provided cheese containing cellulose ether having a methoxy group content of 26 to 33% by weight. Optionally, the cheese of the present invention further contains an alginate and a calcium salt.

In the present invention, the specific cellulose ether contained in cheese exerts a heat reversible action so that excellent heat coagulation properties are imparted to cheese upon heating and, after heating, upon cooling or eating, good melting properties are imparted to the cheese.

Thus, the cheese of the present invention possesses heat resistant shape retention and separation and breakup preventing properties even upon heating from inside the food such as heating by microwave irradiation and, therefore, is useful in food processing.

Further, by employing a suitable drying method, a dehydrated cheese having good reconstitution properties with hot water is obtained and it is used as an ingredient of instant foods to be cooked with microwave oven.

DETAILED DESCRIPTION OF THE INVENTION

The cheese of the present invention comprises cellulose ether having a methoxy group content of 26 to 33% by weight, conventional cheese and optionally a water-soluble alginate and a calcium salt.

The conventional cheese may be natural cheese, so-called "filled cheese" or "imitation cheese" and therefore includes cheese using a milk component which is obtained by a process different from a conventional process for producing natural cheese (e.g., cream, butter, butter oil, rennet casein) or heterogeneous fats and oils or protein which are not derived from milk, for Example, cheese obtained by the processes described in U.S. Pat. No. 3,922,374, Japanese Patent Publication No. 54-1784 (WPI C79-B15085B), U.S. Pat. Nos. 3,873,729 and 4,444,800, Japanese Patent Application No. 61-163206 (co-pending U.S. patent application Ser. No. 71,705) and the like.

Cellulose ether having a methoxy group content of 26 to 33% by weight shows hot water-insoluble property. This property is of importance for providing extremely good shape retention against so called internal heating such as microwave irradiation heating, and at the same time, for maintaining the original mouthfeel of cheese when eaten after heating. Such a cellulose ether includes methyl cellulose and hydroxyalkylmethyl cellulose (e.g., hydroxypropylmethyl cellulose). For Example, there can be used commercially available products such as "Metholose (trade mark)" SM or SH type manufactured by Shin-Etsu Chemical Co., Ltd., Japan.

Additives other than such cellulose ether which show heat coagulation properties, for Example, albumin or soybean protein, or viscosity modifiers such as starch or gelatin have little effect on shape retention against microwave irradiation heating or prevention of separation and breakup. Further, sometimes they adversely affect mouthfeel of cheese upon eating.

The cheese of the present invention can contain 0.5 to 6% by weight, preferably 1 to 4% by weight of the cellulose ether based on the solid matter of the cheese. However, in the case of using cellulose ether having high viscosity, particularly, that having a viscosity of 10,000 cps or more (viscosity of 2% aqueous solution at 20° C.) or using cellulose ether in combination with a water-soluble alginate and a calcium salt, the amount thereof may be 0.5 to 2% by weight. When the content of the cellulose ether is too low, the desired effect of addition can not be expected. On the other hand, when it is too much, no increased effect of addition can be observed.

A method for incorporation of the cellulose ether with cheese is not particularly limited and any method can be employed in so far as good dispersion thereof in cheese can be obtained. When the cellulose ether is added to cheese at a temperature of 70° to 80° C. or higher, the cellulose ether is preferably added as powder because better dispersion can be obtained. When the cellulose ether is added to cheese at a lower temperature, it can be added as an aqueous solution thereof.

In the present invention, optionally, a water-soluble alginate and a calcium salt can be used in addition to the cellulose ether and, thereby, the amount of the cellulose ether to be added can be decreased as described above.

As the alginate, there can be used sodium alginate or potassium alginate. Different from heat coagulable additives, the alginate is gelled with a divalent metallic ion. According to the present inventors' study, among polysaccharides which can be gelled similarly, the alginate is only one material which is effective when used in combination with the cellulose ether. However, in the case of using the alginate alone, a large amount of the alginate should be added, otherwise shape retention against heat can not be obtained. And, in this case, a hard non-reconstituted part remains after reconstitution with hot water. Therefore, the use of the cellulose ether is essential and the cellulose ether should be added in the amount of at least 0.5% by weight based on the solid matter of cheese as described above to obtain cheese having microwave resistance which does not remain a non-reconstituted hard part at reconstitution with hot water. If the alginate is used, the amount of alginate is 0.3 to 3% by weight based on the solid matter of cheese. When the amount is too small, the amount of cellulose ether having viscosity of not more than 10000 cps to be added can not be reduced. On the other hand, the amount is too much, a jelly-like mouthfeel appears, thus losing the original mouthfeel of the cheese and the resulting dehydrated product is hardly reconstituted with hot water with remaining a non-reconstituted hard part.

When the alginate is used, as described above, it is sufficient to use the cellulose ether in an amount of at most 2% by weight.

A method for incorporation of the cellulose ether and the alginate with cheese is not particularly limited and any method can be employed in so far as good dispersion thereof in cheese can be obtained. In general, the alginate is dissolved in hot water at 70° C. or higher before addition thereof to cheese. The cellulose ether can be added as described above.

In general, calcium is originally contained in cheese. However, the amount of calcium in cheese is variable and the bonding with casein is not constant. Accordingly, in general, the desired result can be obtained by using the above alginate together with a calcium salt. In this case, the suitable amount of the calcium salt to be added is usually 0.1 to 1% by weight based on the solid matter of cheese calculated as calcium. When the amount is too small, the desired effect can not be obtained and, when the amount is too much, mouthfeel becomes inferior. Any edible calcium salt can be used. For Example, there can be used calcium chloride and calcium lactate.

The calcium salt can be added to cheese directly or after dissolving in water. Particularly, when it is added to cheese after addition of the alginate, smoothened tissue and improved shape retention of the product can be obtained.

The particular advantages of the present invention are found in good shape retention of hard type or semi-hard type cheese and prevention of separation and breakup of soft type cheeses after microwave irradiation heating. Thus, the cheese of the present invention can be used for dried instant foods in the form of dehydrated cheese. As a process for producing dehydrated cheese which can be readily reconstituted with water, the following process is particularly preferred.

The process comprises adding methyl cellulose to hydrated raw materials containing as a main ingredient emulsified cheese which has been subjected to heat-melt treatment, stirring at a temperature lower than the melting point, and drying with shaping. One aspect of this process is further illustrated in detail.

That is, as the main raw material, emulsified cheese which has been subjected to heat-melt treatment is used. In the raw materials, the content of the heat-melt treated cheeses is at least 50% by weight, preferably not less than 60% by weight. Cheese which has not been subjected to heat-melt treatment (typical Example is natural cheese) can be also used. However, when the amount of cheese without heat-melt treatment is too much, the resulting product is liable to cause oil-off after drying and reconstitution with hot water. Emulsification by heat-melt treatment can be conducted almost in the same manner as a known process for producing processed cheese from natural cheese. As the heat-melt treated emulsified cheese, processed cheese can be used. When the shape retention after heating and cooling is required, the starting cheese is desirably of the hard type or semi-hard type cheese. However, soft type cheese can be also used for the purpose of solely preventing separation and breakup upon heating. Heat melting is generally conducted at a temperature of 70 ° to 100° C., preferably 80° to 95° C. for 10 to 20 minutes. A molten salt (emulsified salt) is not essential when a special emulsification operation is carried out (e.g. Japanese Patent Laid Open Publication No. 61-135542 (WPI C86-087097)). However, usually, it is preferred to use the salt in an amount of not less than 0.1% by weight, preferably not less than 1.0% by weight based on the starting cheese. A known molten salt can be used and examples thereof include orthophosphate, pyrophosphate, polyphosphate, methaphosphate, citrate, and citric acid and they can be used alone or in combination.

Water content of a mixture of the hydrated raw materials to be dried is 35 to 70% by weight, preferably 50 to 65% by weight. Desirably, in view of improvement of reconstitution with hot water, water corresponding to 5 to 30% of the above water content is that added during the period from after emulsification by heat melting to completion of stirring at a temperature lower than the melting point as described below.

The temperature at which stirring is conducted is lower than the melting point. More particularly, the temperature employed is a temperature several degrees centigrade higher than the melting point of the fats and oils contained in the cheese, or lower. Usually, it is within the range of 0° to 50° C., more preferably, 10° to 30° C. When the stirring temperature is higher than the melting point of fats and oils contained in the cheese by more than several degree centigrade, the product becomes liable to cause oil-off. Further, when the stirring temperature is so high that heat melting is completely effected, the tissue of the product remains dense and no improvement of reconstitution with hot water is obtained. On the other hand, when it is too low, admixing is very difficult and granules are liable to remain by stirring for a short period of time.

Stirring is preferably conducted at the above temperature so that neither blocks nor granules are macroscopically observed. If stirring is conducted in such way that blocks or granules are readily observed, they are liable to remain as non-reconstituted hard parts after reconstitution with hot water. It is sufficient to conduct stirring until the above blocks or granules can not be observed. As the means for stirring employed in this step, even those providing great shearing force such as a silent cutter, a cutter mixer, an automated mortar ("raikai-ki" in Japanese) and the like can be used without disadvantages such as too strong mixing, and it is possible to restore original viscosity and smooth mouthfeel of cheese. Accordingly, troublesome two-step operation which involves, for Example, steps for producing grated cheese and straining are not required.

The stirred product thus obtained is a viscous liquid or paste and, different from spray drying wherein shape is lost, it is dried while maintaining a certain shape. That is, the stirred product is placed in a container such as a tray or spread on edible materials (e.g., pizza crust, protein film) or, for Example, subjected to extrusion molding and then dried. The drying can be conducted by airborne drying such as hot-air drying, but most preferably, by freeze-drying. The water content of the resulting dehydrated cheese is not higher than 10% by weight.

The dehydrated cheese thus obtained can be readily reconstituted with hot water in a short period of time and oil-off is almost prevented. In addition, even if it is heated with microwaves, it has excellent shape retention and separation and breakup are effectively prevented.

The following Examples further illustrate the present invention in detail but are not to be construed to limit the scope thereof. All parts and %'s are by weight unless otherwise stated.

EXAMPLE 1

Dried rennet casein (23 parts), a hardened oil (melting point: 32° C.) (30 parts), water (45 parts), sodium citrate (0.37 part), sodium polyphosphate (1.5 parts), salt (2 parts), citric acid (sufficient to adjust pH of the mixture to 5.7), methyl cellulose ("Metholose SM-1500" manufactured by Shin Etsu Chemical Co., Ltd., Japan viscosity of 2% aqueous solution at 20° C.: about 1500 cps) (0 to 2 parts) and cheese flavor (small amount) were heated and mixed at 90° to 92° C. for 5 minutes (methyl cellulose was added after the temperature reached to 90° C.), then the resulting mixture was cooled and solidified in a refrigerator at 5° C.

EXAMPLE 1(a)

A part of the cheese thus obtained was diced (1.5 cm cubes) and placed in a Petri dish and heated in a microwave oven (600W) for 1 minute and the height of the sample was measured. The results are shown in the following table.

| Methyl cellulose (parts) | 0 | 0.3 | 1.0 | 2.0 |
|---|---|---|---|---|
| Height (cm) | 0.3 | 0.7 | 1.2 | 1.4 |

That is, when no methyl cellulose was added, shape retention of the product was almost lost. When 0.3 part of methyl cellulose (0.5%, calculated based on the solid matter of terms of cheese) was added, the product was partly molten. When 1.0 part (1.8%, calculated based on the solid matter of cheese) or 2.0 parts (36%, calculated based on the solid matter of cheese) of methyl cellulose was added, the product had good shape retention.

EXAMPLE 1(b)

The remaining cheese was cut into pieces (about 2 cm cubes). A portion of them (100 parts) was stirred in a silent cutter (1,600 r.p.m.) at 15° C., while water (33 parts), sodium alginate ("Duckalgin NSPM" manufactured by KIBUN FOOD CHEMIFA CO., LTD., Japan) (1 part) and calcium chloride (0.5 part) were added thereto and the mixture was mixed for about 3 minutes to obtain a paste having the final water content of 56 to 58%. The resultant product was placed on a tray for drying so that the thickness thereof became about 8 mm and left in a freezer at −30° C. for 3 hours to freeze it. Then, it was diced (about 8 mm cubes) and dried (0.3 torr, 40° C.) for 15 to 18 hours.

The dehydrated cheese thus obtained having a water content of 3.5% was filled in a container with water (130 cc) and heated in a microwave oven (600W) for 4.5 minutes and shape retention and mouthfeel thereof were evaluated according to the following criteria.

Shape retention

A: very good
B: good
C: a little breakup
D: no shape retention

Mouthfeel

A: very good
B: good (cheese like mouthfeel)
C: paste like mouthfeel

The results are shown in the following table.

| Methyl cellulose (parts) | 0 | 0.1 | 0.3 | 0.6 | 1.2 |

| -continued | | | | | |
|---|---|---|---|---|---|
| Based on solid matter (%) | 0 | 0.15 | 0.5 | 1.0 | 2.0 |
| Shape retention | D | C | B | A | A |
| Mouthfeel | — | C | B | B | A |

That is, when no methyl cellulose was added, shape retention of the product was almost lost. When 0.3 parts (0.5%, calculated based on the solid matter of cheese) of methyl cellulose was added, the product was partly molten. When 0.6 parts (1.0%, calculated based on the solid matter of cheese) or 1.2 parts (2.0%, calculated based on the solid matter of cheese) of methyl cellulose was added, the product had good shape retention.

EXAMPLE 2

Each of commercially available processed cheese of standard hardness (a) (water content: 44.5%), processed cheese having high heat resistance (b) (water content: 42.8%) and processed cheese having great melting properties (c) (water content: 45.0%) was cut into pieces (about 2 cm cubes). A portion of them (100 parts) were stirred in a silent cutter (1,600 r.p.m.) at 15° C., while adding water (33 parts) and the same methyl cellulose as that used in Example 1 (2 parts, 3.5% calculated based on the solid matter of cheese) and the resultant was mixed for about 3 minutes to obtain a paste having the final water content of 56 to 58%.

The resultant product was placed on a tray for drying so that the thickness thereof became about 8 mm and was left in a freezer at −30° C. for 3 hours to freeze it. Then, it was diced (about 8 mm cubes) and dried (0.3 torr, 40° C.) for 15 to 18 hours.

All the dehydrated cheeses thus obtained were free from oil-off immediately after freeze-drying and reconstituted in hot water at about 95° C. within 2 minutes by absorbing water. Further, when each of the dehydrated cheeses was filled in a container with water (130 cc) and heated by a microwave oven (600W) for 4.5 minutes, the cheese showed good shape retention and separation and breakup prevention properties.

As controls, products containing no methyl cellulose were prepared. Regarding reconstitution in hot water at about 95° C., they showed almost the same result as those of the above products of the present invention and reconstituted within 2 minutes by absorbing water. However, when each of the control dehydrated cheeses was placed in a container with water (130 cc) and heated in a microwave oven (600W) for 4.5 minutes, the product prepared from cheese (a) or (b) was partly molten and the product prepared from (c) was broken up.

EXAMPLE 3

Example 2 was repeated by using the raw material cheese (a) except that the amount of methyl cellulose was changed to 0.5 part (0.3%, calculated based on the solid matter of cheese), 1.0 part (1.8 %) or 1.5 parts (2.7%) (Run Nos. M-1, M-2, M-3).

As controls, dehydrated cheeses were prepared by using dehydrated albumin (1 part), isolated soybean protein ("New Fujipro-SE", strongly gelling type, manufactured by FUJI OIL CO., LTD., Japan) (2 parts), corn starch (1 part), astarch (1 part), gelatin (0.5 part) and xanthan gum (0.3 part) instead of methyl cellulose (Run Nos. C-1, C-2, C-3, C-4, C-5, C-6).

According to the same manner as described above, reconstitution was carried out in a microwave oven and shape retention was evaluated according to the following criteria.

A: shape retaining
B: partly molten
C: breakup by melting

The results are shown in the following table. The products of C-1 and C-2 had bad mouthfeel.

| Run Nos. | Shape retention |
|---|---|
| M-1 | B |
| M-2 | A |
| M-3 | A |
| C-1 | B-C |
| C-2 | C |
| C-3 | C |
| C-4 | C |
| C-5 | C |
| C-6 | C |

EXAMPLE 4

Processed cheese of standard hardness (water content: 44.5%) was cut into pieces (about 2 cm cubes). A portion thereof (100 parts) was stirred in a silent cutter (1,600 r.p.m.) at 15° C., while adding water (33 parts) and the same methyl cellulose as that in Example 1 (1 part, about 1.7% based on the solid matter of cheese), sodium alginate (1 part) and calcium chloride (0.5 part) and the resultant product was mixed for about 3 minutes to obtain a paste having the final water content of 56 to 58% (Run No. M-1).

As controls, cheeses were prepared according to the same manner except that sodium alginate was substituted with coagulating agents gelled with calcium, k carrageenan ("CS-44" manufactured by San-Ei Kagaku K.K., Japan) (1 part). l carrageenan ("CS-56" manufactured by San-Ei Kagaku K.K.) (1 part) and LM pectin ("LM-SN-325" manufactured by Taiyo Kagaku Co., Ltd.) (1 part) (Run Nos. C-1, C-2, C-3).

These cheeses were placed on trays for drying so that the thickness thereof became about 8 mm and left in a freezer at −30° C. for 3 hours to freeze them. Then, they are diced (about 8 mm cubes) and dried (0.3 torr, 40° C.) for 15 to 18 hours.

According to the same manner as described above, reconstitution was carried out in a microwave oven and shape retention was evaluated according to the same criteria in Example 3.

The results are shown in the following table. No desired results were obtained by the coagulating agents other than alginate.

| Run Nos. | Shape retention |
|---|---|
| M-1 | A |
| C-1 | C |
| C-2 | C |
| C-3 | C |

EXAMPLE 5

According to the same manner as described in Example 1, cheese was prepared except that metholose (1 part, 1.8% based on the dehydrated cheese) was used. The diced cheese (about 2 cm cube) (100 parts) was stirred in a silent cutter (1,600 r.p.m.) at 15° C., while adding water (33 parts), sodium alginate (1 part) and calcium chloride (0 to 1 part) and then mixed for about 3 minutes to obtain a paste having the final water content of 56 to 58%. The resultant product was placed on a tray for drying so that the thickness became about 8 mm and left in a freezer at −30° C. for 3 hours to freeze it. Then, it was diced (8 mm cubes) and dried for 15 to 18 hours (0.3 torr, 40° C.).

The dehydrated cheese thus obtained was filled in a container with water (130 cc) and heated in a microwave oven (600W) for 4.5 minutes and its shape retention and mouthfeel were evaluated according to the same criteria as described in Example 1.

The results are shown in the following table.

| Calcium chloride (parts) | 0 | 0.05 | 0.25 | 0.5 | 1.0 |
|---|---|---|---|---|---|
| Based on solid matter (%) | 0 | 0.04 | 0.2 | 0.4 | 0.8 |
| Shape retention | D | C | B | A | A |
| Mouthfeel | — | B | B | A | B |

EXAMPLE 6

According to the same manner as described in Example 5, cheese was prepared and diced (about 2 cm cubes). The resultant (100 parts) was stirred in a silent cutter (1,600 r.p.m.) at 15° C., while adding water (33 parts), sodium alginate (0.1 to 3 parts) and calcium chloride (0.5 parts) and then mixed for about 3 minutes to prepare a paste having the final water content of 56 to 58%. The resultant product was placed on a tray for drying so that the thickness became about 8 mm and was left in a freezer at −30° C. for 3 hours to freeze it and then diced (about 8 mm cubes) and dried for 15 to 18 hours (0.3 torr, 40° C.).

The dehydrated cheese thus obtained was filled in a container with water (130 cc) and heated in a microwave oven (600W) for 4.5 minutes and its shape retention and mouthfeel were evaluated.

The results are shown in the following table. The criteria of shape retention are the same as those in Example 1. The criteria of mouthfeel are as follows.
A: very good
B: good
C: slightly remaining non-reconstituted parts
D: remaining hard non-reconstituted parts

| Sodium alginate (parts) | 0.1 | 0.5 | 1.5 | 2.3 | 3.0 |
|---|---|---|---|---|---|
| Based on solid matter (%) | 0.16 | 0.8 | 2.5 | 3.8 | 5.0 |
| Shape retention | C | B | A | A | A |
| Mouthfeel | B | A | A | C | D |

EXAMPLE 7

Commercially available processed cheese having standard hardness (water content: 44.5%) was diced (about 2 cm cubes). A portion thereof (100 parts) was stirred in a silent cutter (1,600 r.p.m.) at 15° C., while adding water (33 parts) and methyl cellulose (viscosity of 2% aqueous solution at 20° C.: 12000 cps or 20000 cps) (1 part, 1.8% based on the solid matter of cheese) and then mixed for about 3 minutes to obtain a paste having the final water content of 56 to 58%. The resultant product was placed on a tray for drying so that the thickness became about 8 mm and left in a freezer at −30° C. for 3 hours to freeze it and then diced (about 8 mm cubes) and dried for 15 to 18 hours (0.3 torr, 40° C.).

The dehydrated cheese thus obtained did not show oil-off immediately after freeze drying and reconstituted in hot water about 95° C. within 2 minutes by absorbing water. When the cheese was filled in a container with water (130 cc) and heated in a microwave oven (600W) for 4.5 minutes, it showed good shape retention and separation and breakup prevention properties.

What is claimed is:

1. A process for producing a dehydrated cheese which comprises admixing cheese, water, and cellulose ether having a methoxy group content of 26 to 33% by weight selected from the group consisting of methyl cellulose, hydroxyalkylmethyl cellulose and a combination thereof in an amount of 0.5 to 6% by weight based on the solid matter of cheese to form a water-containing paste, shaping the paste and drying the shaped while maintaining its shape so that the water content thereof becomes not higher than 10% by weight.

2. The process according to claim 1, wherein drying is carried out by freeze-drying.

3. The process according to claim 1, wherein cellulose either has a viscosity of not lower than 10000 cps as its 2% aqeuous solution of 20° C.

* * * * *